US009098859B2

(12) United States Patent
Moinuddin et al.

(10) Patent No.: US 9,098,859 B2
(45) Date of Patent: Aug. 4, 2015

(54) BRINGING ACHIEVEMENTS TO AN OFFLINE WORLD

(75) Inventors: Mohammed Moinuddin, Bellevue, WA (US); Joseph Futty, Sammamish, WA (US); Matthew Graham Dyor, Bellevue, WA (US); Dan E. Walther, Redmond, WA (US); Sreenivas Gollapudi, Cupertino, CA (US); Stelios Paparizos, San Jose, CA (US); John C. Shafer, Los Altos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 42 days.

(21) Appl. No.: 13/095,504

(22) Filed: Apr. 27, 2011

(65) Prior Publication Data

US 2012/0277004 A1 Nov. 1, 2012

(51) Int. Cl.
*A63F 9/24* (2006.01)
*A63F 13/00* (2014.01)
*G06F 17/00* (2006.01)
*G06F 19/00* (2011.01)
*G06Q 30/02* (2012.01)

(52) U.S. Cl.
CPC .................................... *G06Q 30/02* (2013.01)

(58) Field of Classification Search
CPC ........................... A63F 13/216; A63F 13/332
USPC ............................................ 463/16; 713/176
See application file for complete search history.

(56) References Cited

U.S. PATENT DOCUMENTS

| 4,908,761 | A | 3/1990 | Tai |
| 4,941,090 | A | 7/1990 | McCarthy |
| 6,026,370 | A | 2/2000 | Jermyn |
| 6,824,469 | B2 * | 11/2004 | Allibhoy et al. ................ 463/40 |
| 7,424,617 | B2 * | 9/2008 | Boyd et al. .................... 713/176 |
| 2002/0004754 | A1 | 1/2002 | Gardenswartz et al. |
| 2002/0120496 | A1 | 8/2002 | Scroggie et al. |
| 2002/0123926 | A1 | 9/2002 | Bushold et al. |
| 2004/0193489 | A1 | 9/2004 | Boyd et al. |

OTHER PUBLICATIONS

Nsakanda, et al., "A Predictive Model of Redemption and Liability in Loyalty Reward Programs Industry", In Proceedings of the 43rd Hawaii International Conference on System Sciences, Jan. 5-8, 2010, 11 pages.

Berman, Barry, "Developing an Effective Customer Loyalty Program", In California Management Review, vol. 49, Issue No. 1, 2006, pp. 123-148.

(Continued)

*Primary Examiner* — Milap Shah
*Assistant Examiner* — Jason Pinheiro
(74) *Attorney, Agent, or Firm* — Micah Goldsmith; Judy Yee; Micky Minhas

(57) ABSTRACT

An achievement system tracks users' offline activities and awards achievements to users for participation in particular offline activities. The achievements that are awarded for particular activities and/or to particular users may be sponsored by merchants, who may compensate an achievement system provider for the opportunity to sponsor the achievements. To award users achievements, the users' offline activities are tracked. When a user participates in an offline activity for which achievements are available, the user is awarded an achievement. The achievement may be stored in an achievement profile for the user. In some embodiments, achievements earned by users may be converted into other benefits and alternative awards.

6 Claims, 10 Drawing Sheets

(56) References Cited

OTHER PUBLICATIONS

Shopkick, The App, printed, Apr. 28, 2011. http://shopkick.com/app.html.
Stickybits, explore & score, printed Apr. 28, 2011. http://www.stickybits.com/.
Foursquare, About, printed Apr. 28, 2011. http://foursquare.com/about.
Microsoft Points, Xbox LIVE Points, printed Apr. 28, 2011. http://www.xbox.com/en-US/Live/MicrosoftPoints.
Facebook Credits, Facebook Help Center, printed Apr. 28, 2011. http:www.facebook.com/?page=837.
Bing, Sign up—Bing Rewards Preview, printed Apr. 28, 2011. http://bing.rewards/signup/SEGetStarted?FORM=MRWHPG&PUBL=BINGY . . . .
Points.com, What is Points.com?, printed Apr. 28, 2011. https://www.points.com/pdccontent/whatispoints.html.

* cited by examiner

BRINGING ACHIEVEMENTS TO AN OFFLINE WORLD

BACKGROUND

Some electronic gaming systems award achievements to players for performing certain actions or achieving certain goals within particular games. The achievements earned are typically not a form of a virtual currency and have no monetary value. In some cases, the achievements contribute to a gamer score. For instance, the achievements may each be worth a number of points that contribute to the gamer score. The achievements earned and/or gaming score for a user are typically maintained in a gamer profile for the user, which may be shared with other users.

Achievements have been used in the online gaming world to motivate behavior of users at minimal cost to the motivator. However, achievements have been limited, in the past, to the online world. While achievements have been effective at altering or changing a user's behavior in the online world, a transition to using achievements in an offline world has yet to be made in an effective manner. Consequently, changing or altering a user's behavior in the real world (offline world) would open a new avenue for potential marketing, sales, and other opportunities.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to awarding achievements to users based on participation in offline activities. The achievements for particular activities and/or users may be sponsored by merchants, who may compensate an achievement system provider for the opportunity to sponsor the achievements. To award users achievements, the users' offline activities are tracked. When a user participates in an offline activity for which achievements are available, the user is awarded an achievement. The achievement may be stored in an achievement profile for the user. In some embodiments, achievements earned by users may be converted into other benefits and alternative awards.

BRIEF DESCRIPTION OF THE DRAWINGS

The present invention is described in detail below with reference to the attached drawing figures, wherein.

DETAILED DESCRIPTION

Figure 1:
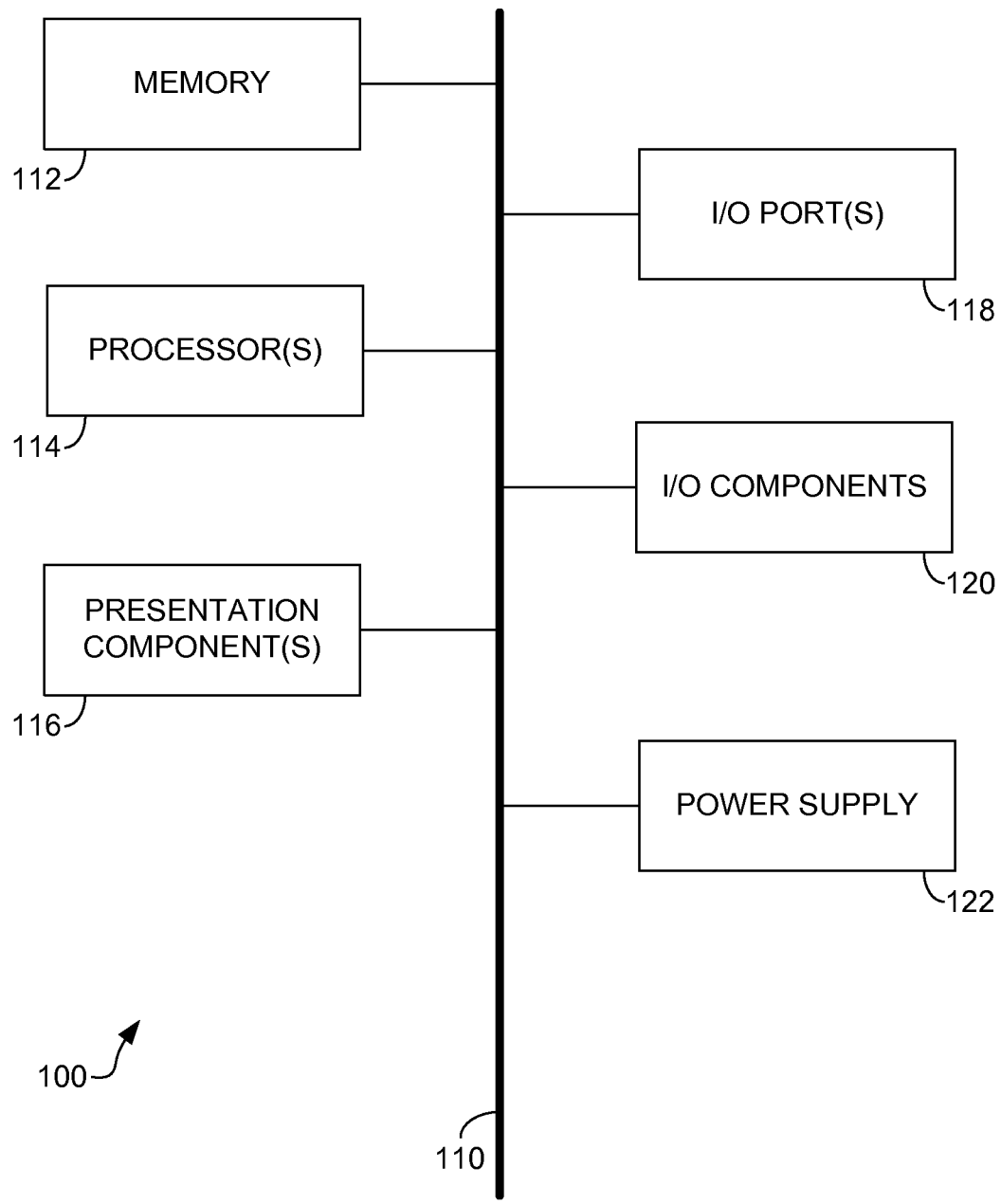
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are directed to awarding achievements to users based on participation in various offline activities. Particular offline activities or types of offline activities may be identified for which achievements may be awarded to users based on participation in those offline activities. The offline activities for which activities may be awarded may be identified and sponsored by various merchants, who may provide compensation to an achievement system provider for the opportunity to sponsor achievements awarded to users. To award achievements to users, the users' offline activities may be tracked. When users are identified as participating in activities for which achievements are earned, the achievements are awarded to the users for their participation in the activities. In some embodiments, merchants may sponsor achievements for particular users, and only those sponsored users receive achievements for participation in certain activities. In further embodiments, achievements may be awarded based on group participation in offline activities based on a threshold participation in the activities being satisfied by a group of users.

Some embodiments of the present invention allow for alternative awards to be provided to users based on achievements earned by the users. These alternative awards may include, for instance, an amount of a virtual currency, a rebate, a coupon, a gift card, or an opportunity for an early adoption of a game, software, product, experience or the like. For example, when users earn a certain level of achievements, the users may be provided an award. In some embodiments, when users earn achievement based on activities, users may be given the option to receive achievements or an alternative award. In further embodiments, users may accumulate achievements and choose to redeem the accumulated achievements for an award, which removes the redeemed achievements from their achievement profiles. Groups of users may also able to pool their achievements to earn awards. In some embodiments, a brokering service may be provided in which users may trade achievements and other forms of awards.

In still further embodiments, users may earn awards when identified as achievement leaders at a particular time and location. For instance, users currently visiting a particular location (e.g., a store) may be identified, and those users who have the greatest achievements may be identified as leaders. The leaders may be provided offline benefits (e.g., discounts, free merchandise, pass to the front of the line, etc.).

Accordingly, in one aspect, an embodiment of the present invention is directed to one or more computer storage media storing computer-useable instructions that, when used by one or more computing devices, cause the one or more computing device to perform a method. The method includes identifying an offline activity for which merchant-sponsored achievements are awarded to users for participation in the offline activity. The method also includes tracking a user's offline activities. The method further includes identifying participation in the offline activity by the user based on the user's offline activities. The method still further includes awarding an achievement to the user for participation in the offline activity.

In another embodiment, an aspect of the invention is directed to one or more computer storage media storing computer-useable instructions that, when used by one or more computing devices, cause the one or more computing device to perform a method. The method includes identifying a user for which achievements are sponsored by a merchant. The method also includes tracking offline activities of the user. The method further includes identifying, from the offline activities of the user, participation in an offline activity for which the user earns an achievement based on the offline activity and the user being sponsored by the merchant. The method also further includes awarding the achievement to the user and storing the achievement in an achievement profile for the user.

A further embodiment of the present invention is directed to one or more computer storage media storing computer-useable instructions that, when used by one or more computing devices, cause the one or more computing device to perform a method. The method includes identifying an offline activity for which achievements will be awarded to groups of users for participation in the offline activity. The method also includes identifying a group of users and tracking offline activities of the group of users. The method further includes identifying participation in the offline activity by one or more users from the group of users. The method still further includes awarding one or more achievements based on the participation in the offline activity by the one or more users from the group of users.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

As discussed previously, embodiments of the present invention are generally directed to monitoring users' offline activities and awarding achievements based on participation in particular offline activities. Generally, a user's participation in various offline activities may be tracked. When the system determines that a user participates in a particular activity for which achievements are awarded, the user's participation in the activity is identified and an achievement is awarded to the user based on that participation. The achievement may then be stored in a user achievement profile that maintains achievements earned by the user.

In embodiments, an achievement system provider may provide a system that operates to track users' offline activities, identify user participation in particular offline activities that earn achievements, award achievements to users, and maintain achievement profiles for users that track user achievements. The system may also provide a number of other related functions, as will be described in further detail herein. The achievement system provider and its functions described herein may be provided by a single entity or multiple entities in various embodiments of the present invention. In some embodiments, the achievement system provider may also be a gaming system provider (such as the MICROSOFT Corporation which provides the XBOX gaming system and XBOX LIVE service). In such embodiments, users may earn achievements from both gaming activities (i.e., gaming achievements) and achievements from offline activities (i.e., offline achievements), and both types of achievements may be maintained in a common profile, such as a user's gamer profile.

Participation in offline activities and other metadata regarding users' offline activities may be tracked by the achievement system in any of a variety of different manners. By way of example only and not limitation, a user's participation may be automatically identified using a network-connected mobile device (e.g., the user's mobile phone). For instance, in some embodiments, the user's participation in an activity may be automatically determined by employing the network-connected mobile device to identify the user at a particular location at a particular time. In other embodiments, the user may employ the network-connected mobile device to manually check-in to a particular activity. This could include, for instance, the user employing an application on the mobile device to manually check into the activity or using the mobile device to scan a code presented at the activity. It is also contemplated that the user's mobile device may include near-file communication (NFC) capabilities and the user may check into an activity by placing the mobile device near an NFC device used to track participation at an activity.

In further embodiments, a network-connected device may not be required to track users' activities. Instead, other approaches may be employed. For instance, a non-connected device having a removable drive or locally downloadable memory may be employed by a user to confirm participation in an activity or otherwise collect metadata regarding the user's offline activities. As more specific examples, it is contemplated that a small device having an RFID chip, a scanner, or a GPS chip may be distributed to a user to identify the user in offline locations, to allow the consumer to check into activities, and/or to monitor the user's location without requiring the user to employ a mobile phone. Data may also be stored on the non-connected device, which may then either be uploaded by the consumer or read by a reading device in a location participating in the system. In still further embodiments, users may receive a code when participating in an activity and may enter the code, for instance, using a home computer after returning home. Any and all such variations of tracking user activities are contemplated to be within the scope of embodiments of the present invention.

The amount and level of detail of user locations, activities, and other information tracked by the system may be controlled by each user. For instance, to protect users' privacy interests, the system may require a user's consent before collecting information for the user. Additionally, the user may be given control over what information is collected and used by the system.

Any type of offline activity may be used to award achievements to users. For instance, users could receive achievements for participating in physical activities (hiking, running events, fitness classes, etc.), commerce-related activities (shopping at particular stores, purchasing items, etc.), or other activities in the real world. In some instances, specific offline activities having a particular time and location may be identified as activities for which achievements will be awarded. In other instances, types of activities with certain characteristics may be defined and when a user participates in an activity that meets those characteristics, achievements may be awarded.

In some embodiments, the offline activities or types of activities for which achievements will be awarded may be defined by the achievement system provider. In some embodiments, however, a merchant-driven approach may be employed in which merchants may sponsor achievements for specific offline activities or types of offline activities. In particular, merchants may identify particular offline activities or types of offline activities for which achievements are awarded to users. In some embodiments, the merchants may purchase the right to sponsor achievements for offline activities by paying a monetary amount to the achievement system provider.

When a merchant sponsors an achievement, some indication may be provided to users to inform the users that the achievement was sponsored by the merchant. In some embodiments, the merchant's name or other message may be displayed in association with the achievement in a user's achievement profile. For example, a message such as, "This achievement brought to you by XYZ Company," could be displayed in association with an achievement sponsored by a merchant. As such, merchants may be incentivized to sponsor achievements as a form of advertising and brand recognition.

Merchants may chose to sponsor any type of offline activity. In some embodiments, this may include a merchant sponsoring achievements for offline activities specifically provided by that merchant. As an example to illustrate, suppose that the merchant is a yoga studio that provides yoga classes. The merchant could chose to sponsor achievements for user participation in yoga classes provided by that merchant. This may be a way for merchants to drive users to participate in the merchant-provided activities. In other embodiments, a merchant may sponsor achievements for offline activities that are not provided by the merchant. For example, suppose that the merchant is a yoga clothier who manufactures and sells yoga clothing. The merchant could chose to sponsor achievements for user participation in yoga classes (i.e., not provided by that merchant). Additionally, merchants may sponsor specific offline activities (e.g., a specific yoga class at a particular time and location) or may sponsor a type of offline activity (e.g., any yoga class that may meet certain criteria).

Figure 2:
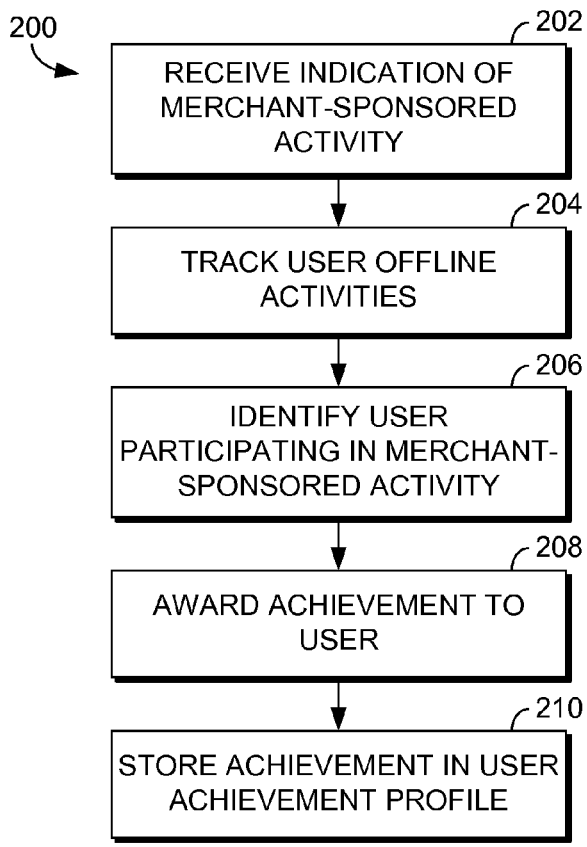
FIG. 2 is a flow diagram showing a method for providing a merchant-sponsored achievement for an offline activity in accordance with an embodiment of the present invention.

Referring now to FIG. 2, a flow diagram is provided that illustrates a method 200 for providing a merchant-sponsored achievement for an offline activity in accordance with an embodiment of the present invention. As shown at block 202, an indication is received of a particular offline activity or type of offline activity for which a merchant intends to sponsor achievements. Based on this indication, the system monitors for user participation in the specific offline activity identified by the merchant (if a specific offline activity is specified) or for user participation in an activity that meets the merchant's specified criteria (if a type of offline activity is specified). Accordingly, as shown at block 204, user participation in offline activities is tracked. As noted above, user participation in offline activities may be tracked using any of a number of different techniques.

User participation in the merchant-sponsored offline activity is identified from the offline activities tracked for the user, as shown at block 206. Based on identifying the user participating in the merchant-sponsored activity, the user is awarded an achievement, as shown at block 208. The achievement is stored in a user achievement profile that maintains achievements the user has earned by participating in offline activities, as shown at block 210. In various embodiments of the present invention, different levels of achievements or achievement points may be award based on different factors, such as characteristics of the user participating in the offline activity, the device used to track the offline activity, and/or the location of the offline activity.

In some embodiments, merchants may choose to target particular users such that those users receive achievements for certain offline activities. For instance, merchants may wish to award achievements, which may include an indication of the merchants' sponsorship, to users having particular characteristics. In a sense, this could be viewed as merchants sponsoring certain users such that only those users receive achievements for participating in particular offline activities. As such, merchants may define criteria that users must satisfy to be awarded achievements sponsored by the merchants when the users participate in particular offline activities or types of offline activities. Only those users who meet the merchants' criteria would be considered to be sponsored by the merchants and receive achievements for participation in particular offline activities.

Similar to the approach discussed above in which merchants may pay the achievement system provider to obtain the ability to sponsor achievements for particular offline activities, merchants may also pay the achievement system provider an amount to sponsor achievements for particular users. Additionally, an indication may be provided to the users that the users are being sponsored by the merchants and/or the achievements were earned through such sponsorship from the merchants.

A variety of different information regarding users may be employed by merchants when identifying users who will receive achievements sponsored by the merchants. This may include demographic information, offline activity information, and other metadata that defines the users. In some embodiments, information regarding users' offline activities, such as location tracking, checking-in at particular activities or location, or purchase history, may be tracked and logged. This log of offline activities may be mined to produce a profile of the user for identifying various activities, hobbies, or lifestyles that partially define the user. This repository of information may be used by a merchant that desires to sponsor achievements for people with particular characteristics and/or engaging in activities associated with the merchant or that the merchant would otherwise like to target. For example, a yoga clothier may wish to sponsor individuals who regularly attend yoga classes or meet other particular metadata attributes. The metadata collected for individuals could allow merchants to identify individuals who are involved in a particular field of offline activities and the level of involvement (e.g., little involvement to heavily involved). A different level of achievements or different number of achievement points associated with an achievement may be awarded to different users based on their metadata profiles. Consequently, someone who is identified as being a passive participant in a particular hobby may not be awarded as many achievements or achievement points as someone who is identified as being a more active participant (or vice versa to bring new people into a hobby).

Figure 3:
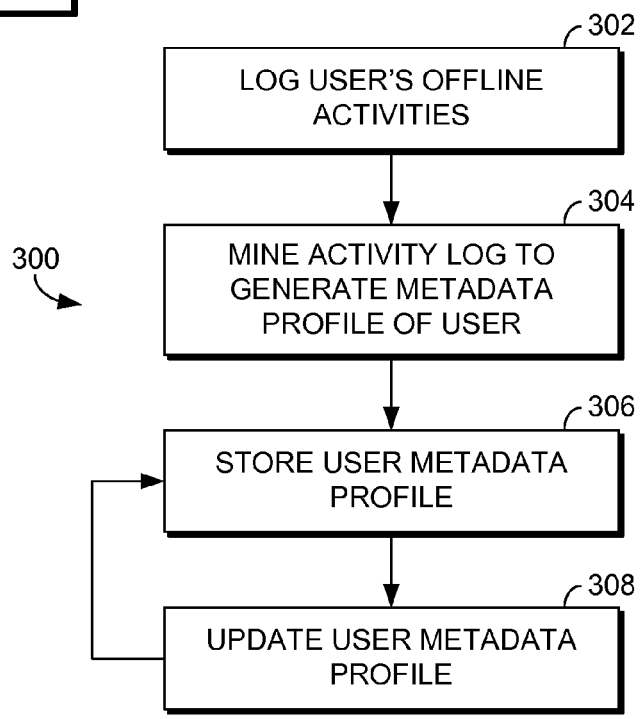
FIG. 3 is a flow diagram showing a method for creating a metadata profile for a user by collecting offline activity information in accordance with an embodiment of the present invention.

Turning now to FIG. 3, a flow diagram is provided that illustrates a method 300 for creating a metadata profile for a user by collecting offline activity information in accordance with an embodiment of the present invention. As shown at block 302, information regarding a user's offline activities is logged over time. As discussed above, a user's offline activities may be tracked using a variety of different data collection methods.

The user's activity log is mined at block 304 to generate a metadata profile of the user. The user metadata profile may identify the various activities, hobbies, and lifestyle that partially define the user. Additional information that helps define the user, such as demographic information or purchase history, may also be included as part of the user metadata profile. Alternatively, the metadata profile may limit the amount of personally identifiable information by aggregating offline activity information (e.g., instead of identifying particular class times and locations for a user, the metadata profile may identify a weekly count of classes attended and a zip code). The user metadata profile is stored, as shown at block 306, such that it may be subsequently used for targeting achievements. After a metadata profile for a user is created and stored, the user metadata profile may also be continuously updated, as shown at block 308, as additional information regarding the user's offline activities is logged and mined.

Figure 4:
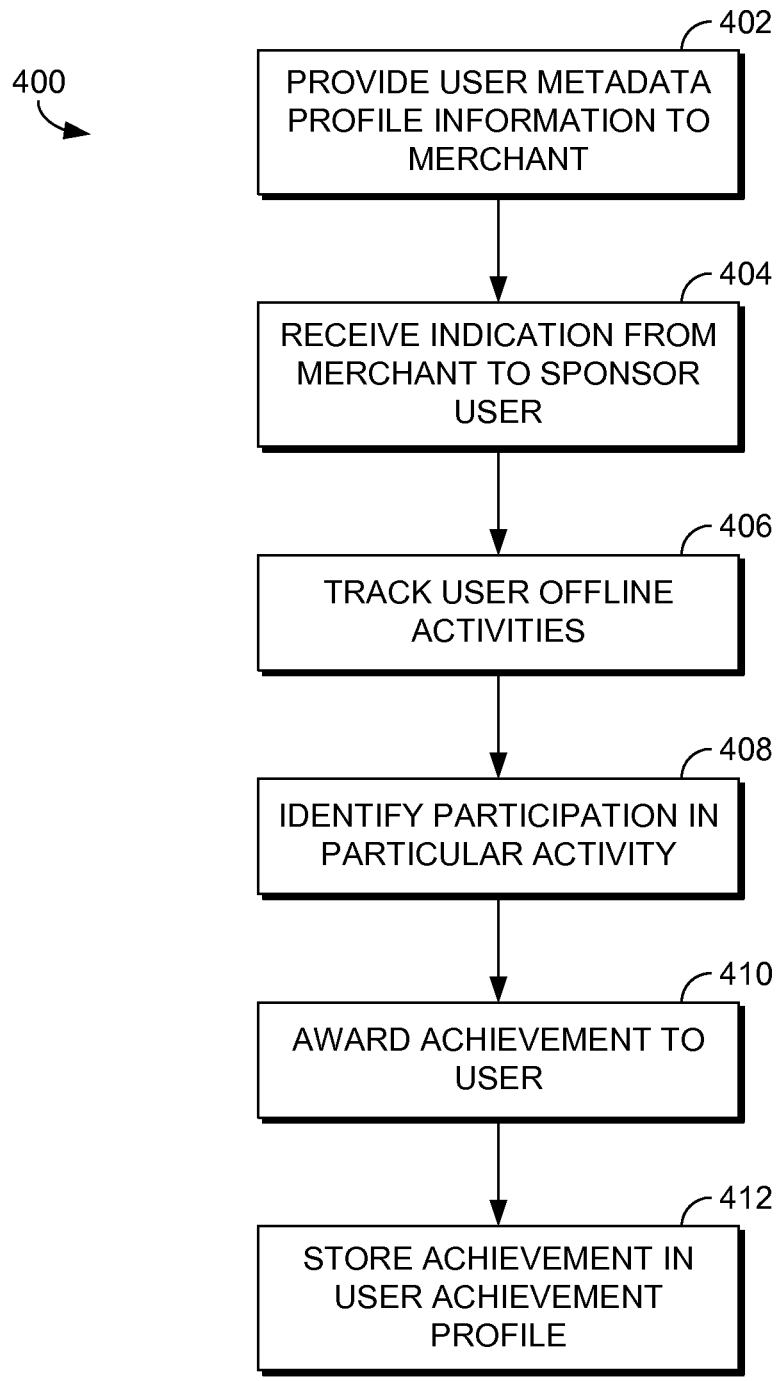
FIG. 4 is a flow diagram showing a method for a merchant to manually select a user to receive achievements in accordance with an embodiment of the present invention.

In some embodiments, merchants may manually review metadata profiles of users and select users to sponsor such that those sponsored users receive achievements for participation in particular activities or types of activities. Referring to FIG. 4, a flow diagram is provided that illustrates a method 400 for a merchant to manually select a user to receive achievements in accordance with an embodiment of the present invention. As shown at block 402, information from a user metadata profile, such as one generated using method 300 of FIG. 3, is provided to a merchant. In practice, user metadata profiles for multiple users may be provided to the merchant to allow the merchant to review the user metadata profiles and identify relevant users.

Based on the user metadata profile, the merchant may decide to sponsor achievements for the user. Accordingly, an indication is received from the merchant to sponsor achievements for the user, as shown at block 404. In some embodiments, an indication may also be provided to the user to let the user know that they have been sponsored by the merchant.

Information regarding the user's offline activities is tracked, as shown at block 406. At some point, the user may participate in an activity for which the user is awarded achievements based on the activity and the user being sponsored by the merchant. This activity may be, for instance, a particular activity identified by the merchant or an activity that meets criteria for a type of activity specified by the merchant. Accordingly, as shown at block 408, participation in such an offline activity is identified. Based on that participation and the user's status of being sponsored by the merchant, the user is awarded an achievement, as shown at block 410. The achievement is stored in the user's achievement profile that maintains the user's achievements at block 412.

Figure 5:
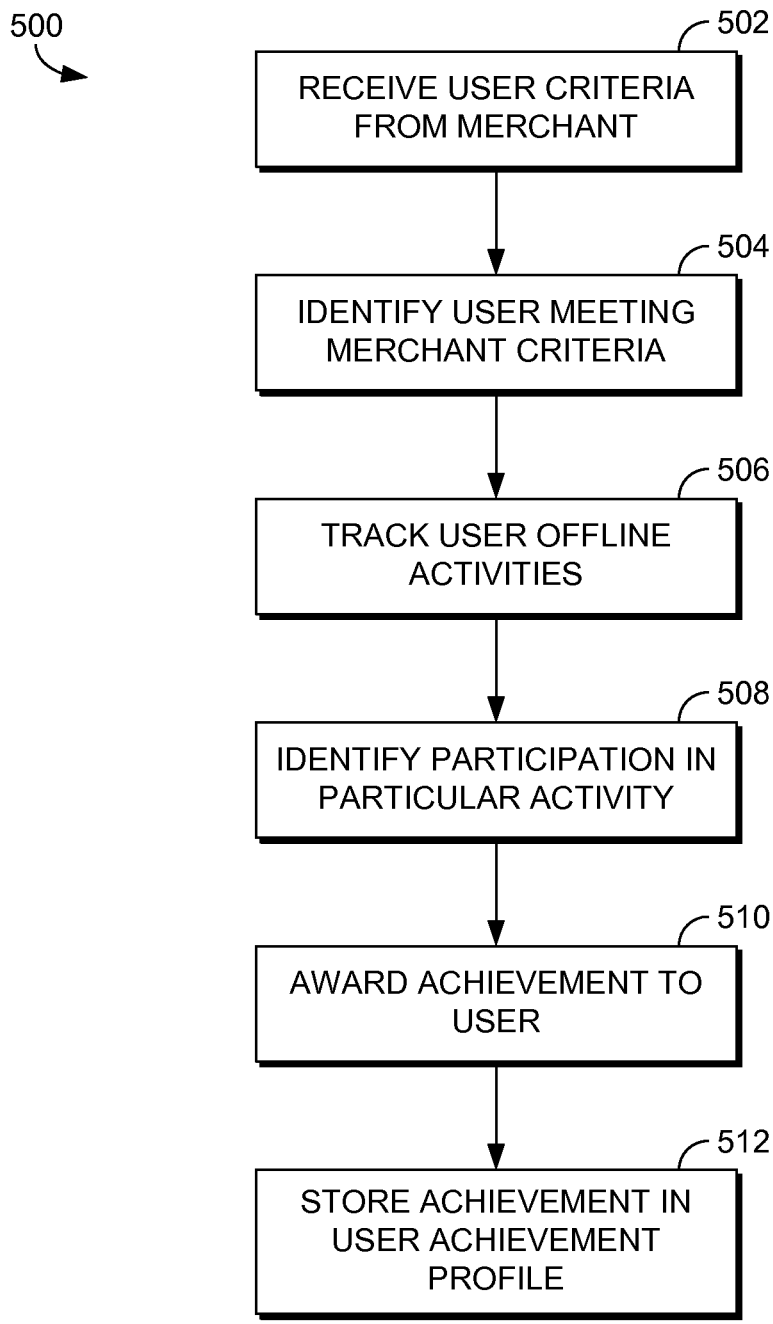
FIG. 5 is a flow diagram showing a method for using merchant-specified criteria to identify users and awarding achievements to such users in accordance with an embodiment of the present invention.

In other embodiments, instead of manually selecting users to sponsor, a merchant may simply specify criteria to be used to allow for automatic identification of users to be sponsored by the merchant. Turning to FIG. 5, a flow diagram is provided that illustrates a method 500 for using merchant-specified criteria to identify users and awarding achievements to such users in accordance with an embodiment of the present invention. As shown at block 502, criteria for targeting users are received from a merchant. The criteria may specify certain characteristics of users the merchant would like to sponsor, including activities, interests, and lifestyles of such users.

Using the criteria provided by the merchant and information from user metadata profiles generated for users using, for instance, the method 300 of FIG. 3, a user is identified as meeting the merchant-specified criteria, as shown at block 504. In practice, multiple users may be identified as meeting the merchant-specified criteria based on information from their profiles. The identified user is considered to be sponsored by the merchant such that the user will receive achievements for participating in particular activities or types of activities. In some embodiments, an indication may be provided to the user to let the user know that they have been sponsored by the merchant.

The user's offline activities are tracked, as shown at block 506. At some point, the user may participate in an activity for which the user is awarded achievements based on the activity and the user being sponsored by the merchant. Accordingly, as shown at block 508, participation in such an offline activity is identified. Based on that participation and the user's status of being sponsored by the merchant, the user is awarded an achievement, as shown at block 510. The achievement is stored in the user's achievement profile that maintains the user's achievements, as shown at block 512.

By way of specific example, a particular type of user (e.g., a male or female, an instructor or a student) may be sponsored by a yoga clothier for the offline activity of "attending 3 yoga classes with merchant-branded clothing." Each time that the user performs the offline activity, as asserted by the user with a mobile application managed by the user, as verified by a yoga class provider with a check-in application managed by the yoga class provider, or by some other technique, the participation in the activity may be identified (e.g., stored in a database). Upon meeting the threshold activity requirement specified by the yoga clothier (e.g., 3 classes wearing merchant-branded clothing), the user may be awarded the achievement and this achievement may be stored in a user achievement profile.

In some embodiments of the present invention, group behavior may be a factor in awarding achievements to users. In particular, certain achievements may only be awarded if a threshold of users within a certain group participates in a particular activity or type of activity. If the threshold is met for an activity, achievements may be awarded to users individually or awarded to the group as a whole (e.g., group achievements may be stored in a group achievement profile). The group of users may be identified based on an existing explicit relationship among the users, such as having the status of "friends" within a social network. In other embodiments, groups of users may be identified based implicit relationships that may be gleaned, for instance, from the users' metadata profile information, such as the profile information generated using the method 300 of FIG. 3. In particular, a correlation/grouping may be drawn between apparent disparate users based on their metadata profile information. Based on social circles, common hobbies, lifestyles, and the like, clusters of users may be joined to particularly identify those that may provide a group mentality in their buying decisions. Consequently, identified groups may be incentivized to make specific buying decisions such that achievements may be earned when a threshold level of the group participates in a particular activity or type of activity.

Figure 6:
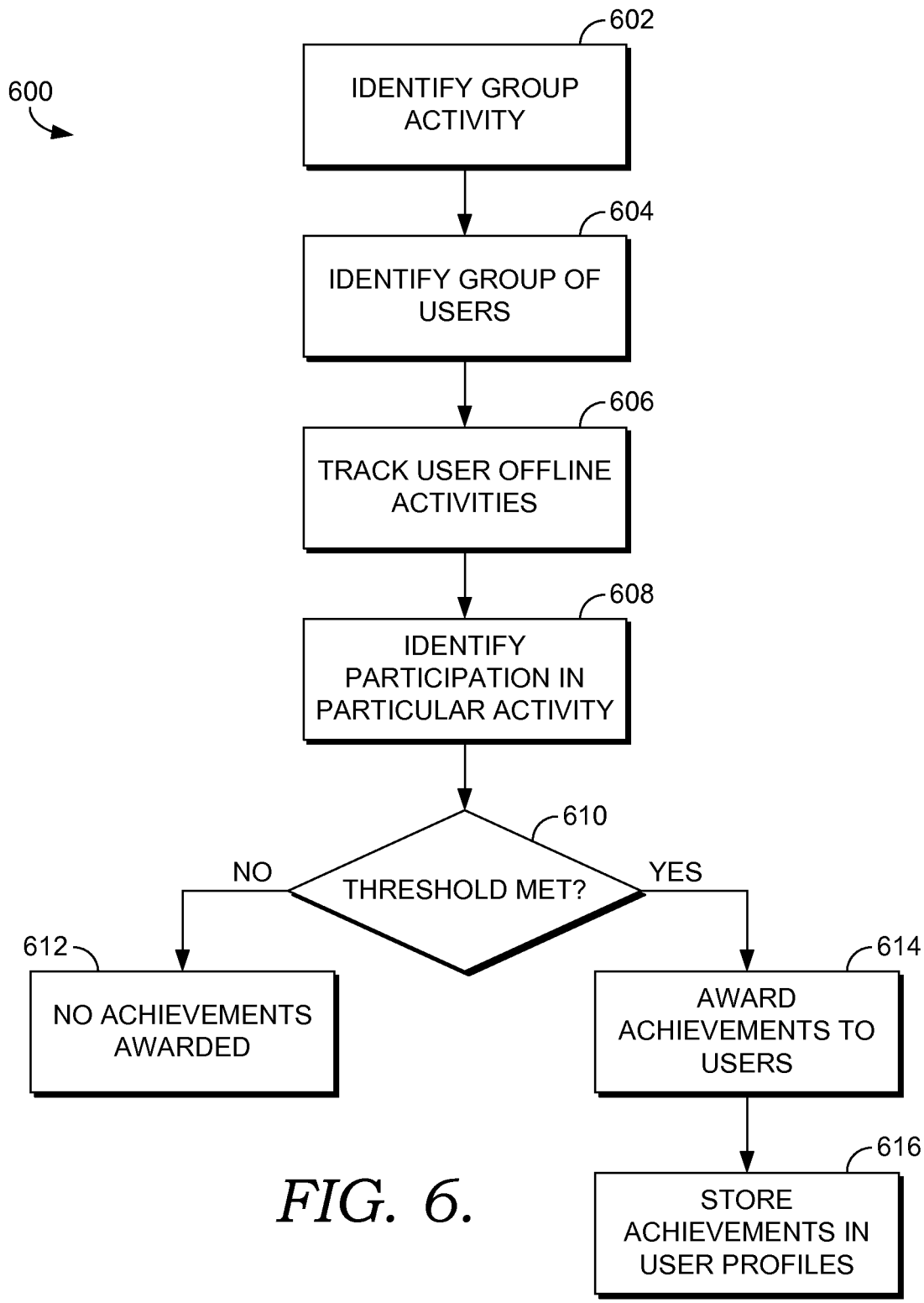
FIG. 6 is a flow diagram showing a method for awarding achievements based on group behavior in accordance with an embodiment of the present invention.

With reference now to FIG. 6, a flow diagram is provided that illustrates a method 600 for awarding achievements based on group behavior in accordance with an embodiment of the present invention. As shown at block 602, a group activity for which achievements may be awarded is identified. In embodiments, a merchant may specify this group activity, which may include a specific activity or a type of activity. Additionally, the merchant may wish to target particular groups. To do so, the merchant may identify parameters for the groups (such as characteristics of users within a group) that would qualify for receiving achievements for participation in the activity. Further, the merchant may specify threshold participation requirements that must be satisfied by a group in order to receive achievements for participation in the activity. This may include a threshold number of users within the group, a threshold percentage of users within the group, or other threshold approach.

A group of users is identified at block 604, including an identification of each of the users within the group. As noted above, correlations may be drawn amongst users based on available information (e.g., activity metadata profiles for the users) that may be employed to identify users as having common interests, hobbies, lifestyles, or otherwise having similar characteristics such that the users could be clustered in a group. In some embodiments in which the merchant may specify group criteria for groups that qualify for receiving achievements in particular activities, the merchant-specified criteria may be used when identifying the group and its members. In other embodiments, groups may be explicitly identified. For instance, users may create a group and identify themselves as a group to the achievement system.

Offline activities of users in the group are tracked, as shown at block 606. At some point, at least some of the users in the group may participate in an activity for which the users may be awarded achievements based on participation of the activity and being a member of the group. Accordingly, as shown at block 608, participation by the group members in such an offline activity is identified. This may be participation in a single activity at a particular time and location or participation in activities over a period of time that meet certain criteria (e.g., attending a yoga class at any time during the week).

A determination is made at block 610 regarding whether a threshold of users within the group have participated in the activity. As noted above, the threshold may be a total number of users from the group, a threshold percentage of the group, or a threshold based on other criteria. If the threshold is not met, no achievements may be awarded as shown at block 612. Alternatively, if the threshold is met, achievements are awarded to the users, as shown at block 614, and the achievements are stored in each of the users' achievement profile that maintain the users' achievements, as shown at block 616. In some embodiments, only users from the group that participate in the activity are awarded an achievement. In other embodiments, however, all users from the group, including those who didn't participate in the achievement, may be awarded an achievement. As an alternative to providing achievements to individual users, some embodiments award achievements to the group as a whole, and store the achievements in a group achievement profile.

As noted previously, in various embodiments of the present invention, the achievements awarded to users based on their participation in offline activities may be maintained by achievement profiles, which may be online accounts for the users that provide an indication of achievements earned by the users as well as other information. The achievement profiles may be able to be viewed by other users, which may include all users or only certain users with access rights (e.g., "friends").

In some embodiments, the achievement profiles may track only the achievements users have been awarded for offline activities. In other words, users may have achievement profiles that are dedicated to tracking offline activity achievements. The achievement profiles may provide a list of the achievements earned by users completing certain offline activities. Additionally, an offline activity score may be computed for users based on their earned achievements. In particular, each achievement may be worth a certain number of points, and a user's offline activity score may simply be the sum of the points from the achievements earned by the user from offline activities. Other approaches, such as weighting various achievements, may be employed for computing users' activity scores. In further embodiments, achievements may be grouped based on different categories of offline activities and a number of offline activity scores may be provided for the different categories of offline activities. By way of example to illustrate, a user may participate in both hiking and biking activities and may earn achievements for those activities. A hiking activity score may be generated based on the hiking activity achievement, while a separate biking activity score may be generated based on the biking activity achievements. As such, it is contemplated that a user's achievement profile may maintain achievements for various different types of offline activities and may not be confined to achievements for certain types of offline activities.

In further embodiments, gamer profiles may serve as achievement profiles for tracking users' achievements for offline activities. In particular, gamer profiles that track users' achievements from gaming (i.e., gaming achievements) may be used to also track achievements users earn from offline activities (i.e., offline activity achievements). As such, the gamer profiles may track achievements users earn from both gaming activities and offline activities. The gaming achievements and offline activity achievements may be maintained separately within a user's gamer profile or may be commingled. For instance, in some embodiments, users may be able to view achievements earned from gaming activities separately from the achievements earned from offline activities.

In some embodiments in which users' gamer profiles are used to track both gaming achievements and offline activity achievements, the gamer profiles may include both a gamer score and an offline activity score for the users. A user's gamer score may be computed based on the gaming achievements earned by the user, while the user's offline activity score may be computed based on the offline activity achievements earned by the user. In further embodiments, a score may be provided as part of a user's gamer profile that is computed based on gaming achievements and offline activity achievements. Various weighting may be applied to the different types of activities when computing the total score. In some instances, the users' gamer scores may comprise such a total score. In other words, a user's gamer score that is indicated for the user's gamer profile may be computed not only based on the user's gaming achievements but also the user's offline activity achievements. Any and all such variations are contemplated to be within the scope of achievements of the present invention.

Additionally, in some embodiments, some achievements may be award based on a combination of both gaming and offline activities. For instance, an achievement may be awarded to the user only if the user performs a particular gaming activity (e.g., completes a certain gaming goal) and participates in a particular offline activity or type of offline activity. This may promote activities in both gaming and offline environments.

Figure 7:
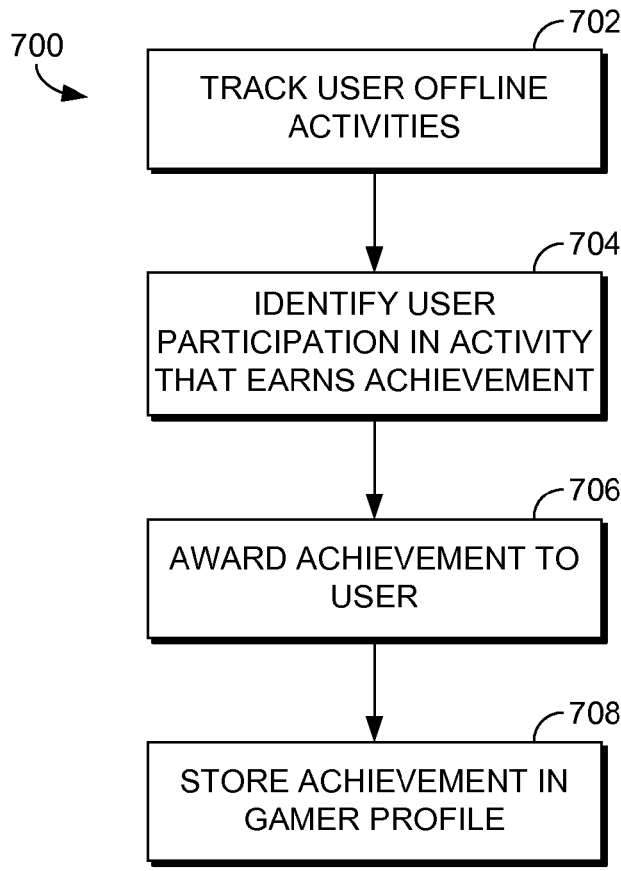
FIG. 7 is a flow diagram showing a method for commingling offline activity achievements with gaming achievements in a gamer profile in accordance with an embodiment of the present invention.

Referring now to FIG. 7, a flow diagram is provided that illustrates a method 700 for commingling offline activity achievements with gaming achievements in a gamer profile in accordance with an embodiment of the present invention. As shown at block 702, user offline activities are tracked. As discussed previously, any of a variety of different methods may be employed for tracking the user's offline activities. At some point, user participation in an offline activity that earns achievements is identified, as shown at block 704.

Based on the user's participation in the offline activity, an achievement is awarded to the user, as shown at block 706. A gamer profile for the user is identified, and the achievement is stored in the user's gamer profile, as shown at block 708. As noted above, in some instances the activity achievement may be stored in the gamer profile separately from the gaming achievements (so they can be discerned) or they may be commingled. Also, as discussed above, an offline activity score and/or gaming score may be updated based on the addition of the added offline activity achievement.

As discussed throughout this description, users may earn achievements when participating in a variety of different offline activities. In embodiments, the achievements are not a form of a virtual currency and have no monetary value. Instead, users may wish to earn achievements for offline activities for a variety of reasons, such as way to track their participation in offline activities. For instance, a runner may earn achievements for completing races of certain lengths. The achievements may serve as a measure of the runner's participation in various races, and may incentivize the runner to become more involved in various running events. Additionally, achievements may serve as a form of bragging rights. For instance, users may wish to earn more achievements than their friends.

Earning achievements in this manner may have a direct or an indirect benefit to merchants. As discussed above, merchants may choose to sponsor achievements for certain offline activities and/or users with certain characteristics. In some instances, the merchant-sponsored activities may be directly associated with the merchant. As such, the achievements may drive users to the merchant's activities and directly benefit the merchant. For instance, the merchant could be a yoga studio that sponsors achievements for participation in yoga classes at the studio.

In other instances, the merchant-sponsored activities may not be directly associated with the merchant. However, the merchant may be indirectly benefited if users become more involved in the activities, which may result in more purchases from the merchant. For instance, suppose that the merchant sells running shoes and other running gear. The merchant may choose to sponsor achievements for certain running events. The achievements may incentivize users to become more involved in running and participate in more running events. As a result, the users may be more likely to purchase running shoes and other running gear more frequently. The users may see that the achievements they've earned have been sponsored by the merchant, and may decide to purchase their running shoes and other running gear from that merchant.

Although achievements may have no monetary value, in some embodiments, users may receive awards that may or may not some monetary value when the users have earned a certain level of achievements, activity score, and/or gamer score. The awards may include, for instance, an amount of a virtual currency, a rebate, a coupon, or a gift card. In some embodiments, the award may be in the form of an opportunity for an early adoption of a game, software, product, experience or the like.

Figure 8:
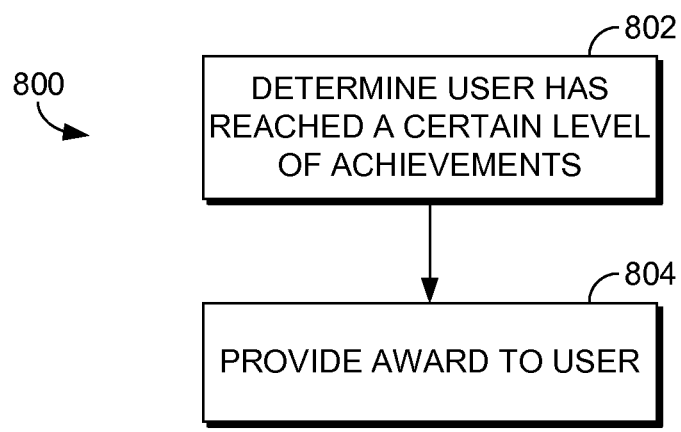
FIG. 8 is a flow diagram showing a method for providing an award to a user based on reaching a certain level of achievements in accordance with an embodiment of the present invention.

With reference to FIG. 8, a flow diagram is provided that illustrates a method 800 for providing an award to a user based on reaching a certain level of achievements in accordance with an embodiment of the present invention. As shown at block 802, a determination is made that the user has reached a certain level of achievements. This may include offline activity achievements and/or gaming achievements. Additionally, this "level of achievements" may include, for instance, the user having received a certain number of achievements, achievement points, achievement score, or gamer score. The achievements that contribute to this level may be only those achievements that were earned from a particular activity or type of activity or may be only those achievements sponsored by a particular merchant. For instance, in some embodiments, merchants may sponsor not only achievements but also other forms of awards that may be provided to users. Based on the user reaching the certain level of achievements, the user is provided an award, as shown at block 804. In some instances, the user may be given the option to select from a number of different award options.

Figure 9:
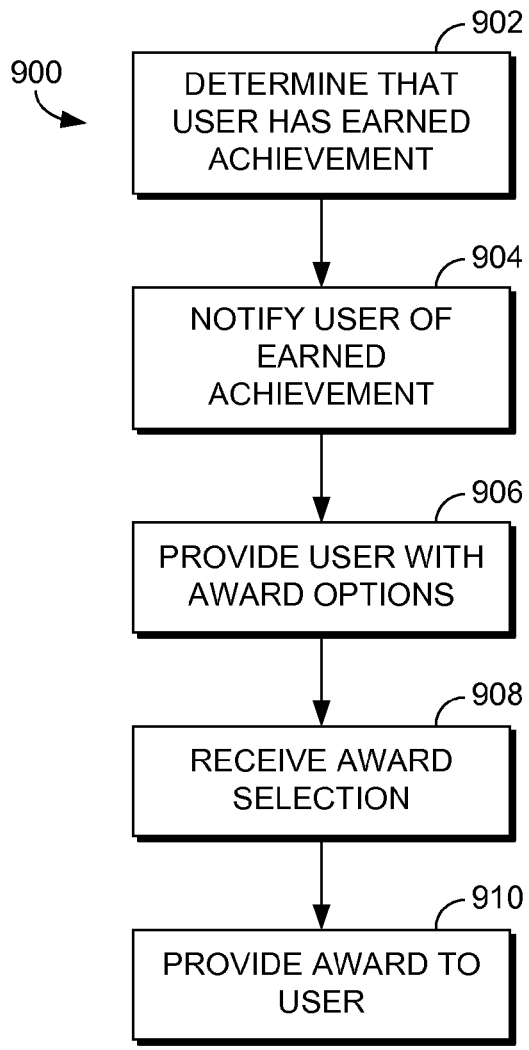
FIG. 9 is a flow diagram showing a method for providing a user with award options when earning achievements in accordance with an embodiment of the present invention.

In further embodiments of the present invention, when users earn achievements (offline achievements and/or gaming achievements), the users may be given the option to receive some form of award other than an achievement in lieu of receiving achievements. As noted above, these awards may or may not have some monetary value. FIG. 9 illustrates a method 900 for providing a user with award options when earning achievements in accordance with an embodiment of the present invention. Initially, as shown at block 902, a determination is made that a user has earned an achievement. The achievement may be earned from participation in an offline activity, may be a gaming achievement, or may be an achievement that may be earned from a combination of both gaming and offline activities.

In response to determining that the user has earned an achievement, an indication is provided to the user to notify the user that the user has earned the achievement, as shown at block 904. Additionally, the user is given the option to select whether to be awarded the achievement or whether to receive another form of an award in lieu of the achievement, as shown at block 906. In some embodiments, the user may be given a number of different award options. For instance, the user could be given the option to choose from awards that include: the achievement, an amount of virtual currency, and a gift card at a brick and mortar store. The notification of the achievement earned and award options may be communicated to the user in a number of different manners within the scope of embodiments of the present invention. By way of example only and not limitation, the notification and award may be provided via the user's mobile device, via an email, via the user's game console, or via an online account.

A user selection of an award is received at block 908. Based on the user selection, the selected award is provided to the user, as shown at block 910. In the event the user chooses to receive the achievement, the achievement is added to the user's achievement profile and the activity score and/or gamer score may be adjusted accordingly. If the user chooses a different award, no achievement is added to the user's achievement profile. Instead, the selected alternative award is provided to the user. This could include, for instance, crediting virtual currency in the user's virtual currency account, providing a coupon that the user may employ at a store, and the like.

In some embodiments, users may accumulate achievements over time based on participation in various activities (e.g., offline activity achievements and/or gaming achievements) and may choose to redeem or "cash in" the accumulated achievements for some other form of award. Users may be given the option to redeem their accumulated achievements for any one of a number of different awards, which may or may not have a monetary value, such as those discussed above.

Figure 10:
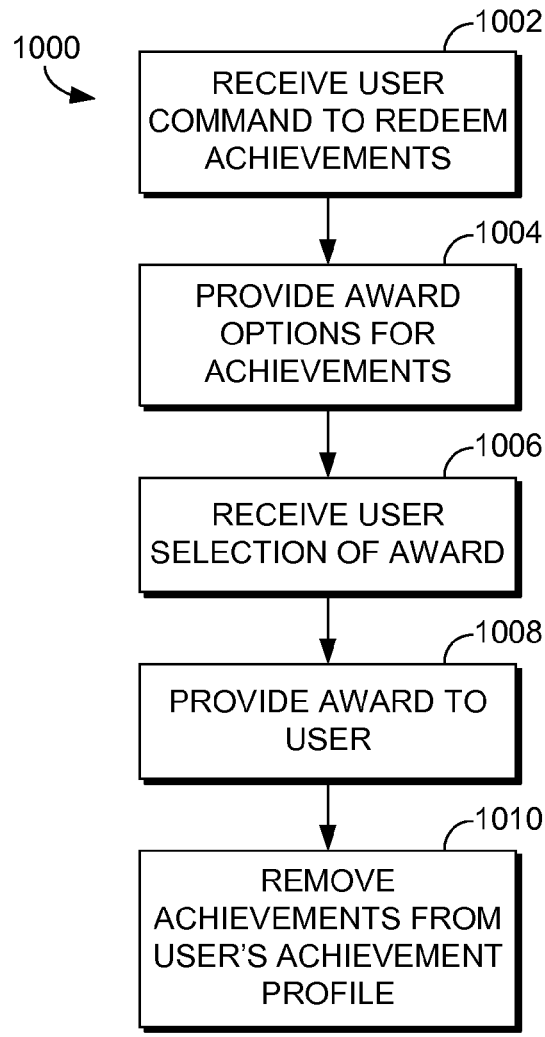
FIG. 10 is a flow diagram showing a method for allowing a user to redeem achievements for another form of award in accordance with an embodiment of the present invention.

Turning now to FIG. 10, a flow diagram is provided that illustrates a method 1000 for allowing a user to redeem achievements for another form of award in accordance with an embodiment of the present invention. As shown at block 1002, a user command is received indicating that the user wishes to redeem achievements. These may include offline activity achievements and/or gaming achievements. In response, a selection of one or more award options is provided from which the user may choose a desired award, as shown at block 1004. In some embodiments, the user may specify the achievements the user wishes to redeem, and the award options that are provided are ones that are available based on those specified achievements. In other embodiments, the award options may specify which awards are available for redeeming which achievements. Further, in some embodiments, only certain achievements may be available for redemption while other achievements are not.

A user selection of an award is received at block 1006. In response to the user selection, the selected award is provided to the user, as shown at block 1008. Additionally, the achievements redeemed for the award are removed from the user's achievement profile, as shown at block 1010.

In some embodiments of the present invention, groups may be able to pool achievements to reach a common goal. As noted above, some embodiments provide for awards based on reaching certain levels of achievements or redeeming achievements for other forms of awards. Accordingly, groups may wish to collectively earn certain awards based on the group's participation in various activities. For instance, the group may be involved in fundraising, and the award may assist in that fundraising by providing a monetary amount, virtual currency, or other award directed to the group's fundraising efforts.

Figure 11:
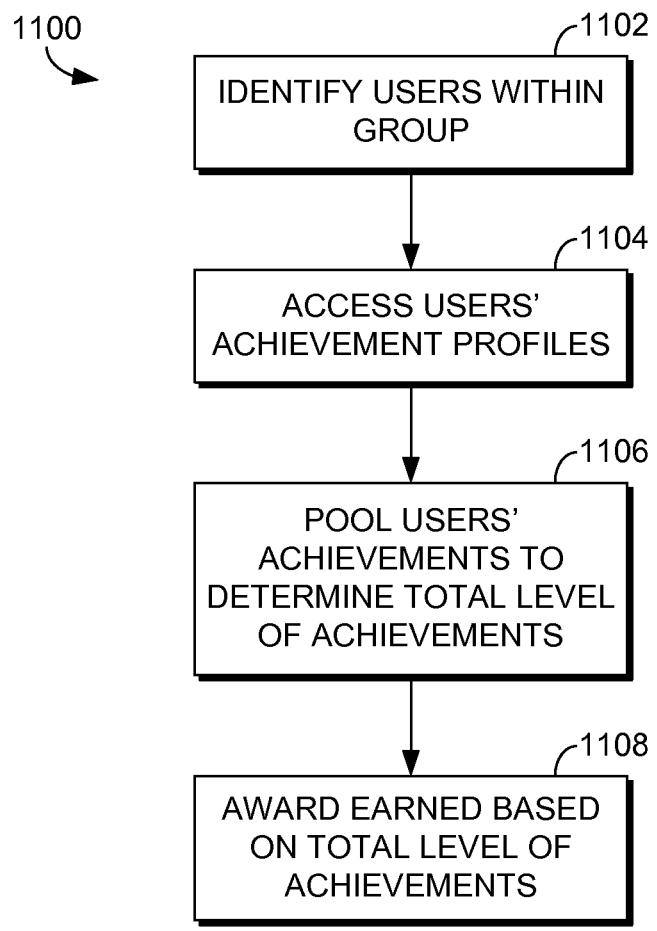
FIG. 11 is a flow diagram showing a method for pooling a group's achievements in accordance with an embodiment of the present invention.

Turning to FIG. 11, a flow diagram is provided that illustrates a method 1100 for pooling a group's achievements in accordance with an embodiment of the present invention. As shown at block 1102, users within a group are identified. User achievement profiles are accessed to determine the achievements held by each of the users in the group, as shown at block 1104. The achievements from the users' achievement profiles are pooled to determine a total level of achievements, as shown at block 1106. This may include offline activity achievements and/or gaming achievements. Additionally, this total "level of achievements" may be based on, for instance, the total number of achievements, achievement points, activity score, or gamer score from users in the group. In some embodiments, only certain types of achievements may be used to determine the total level of achievements for the group of users. For instance, the user achievement profiles may include achievements the users have earned outside of the group activity, such that the total level of achievements may not include those achievements. Additionally, the achievements may be based on different activities (e.g., activities sponsored by different merchants) and the total level of achievement may include only achievements for a certain activities or types of activities (e.g., only activities sponsored by a particular merchant).

As shown at block 1108, an award is earned based on the pooled achievements from the group of users. In some embodiments, the award may simply be earned based on reaching a particular level of achievements (e.g., similar to providing an award based on a level of achievements as discussed above with reference to the method 800 of FIG. 8). In other embodiments, the award may require redemption of achievements such that the achievements are removed from the users' achievements profiles (e.g., similar to redemption of achievements for an award discussed above with reference to the method 1000 of FIG. 10). The award earned may be a single award provided to the group as a whole or may include individual awards provided to each member of the group. Additionally, in some embodiments, a number of award options may be available based on the pooled achievements. In embodiments in which a single award is provided to the group as a whole, an award may be selected from the available options by a group administrator, by a vote of group members, or another approach. In embodiments in which each user is given an individual award, each user may be given the ability to individually select from the available award options.

Providing for alternative awards in addition to or in lieu of achievements for both offline activities and gaming activities provides a further way to merge offline and gaming worlds. For instance, gaming-related awards (e.g., early adoption of new games, virtual currency, online gaming membership, etc.) may be given for earning offline activity achievements. This could be attractive to some parents as it may incentivize their children to do offline activities (e.g., outdoor activities) beyond their gaming activities. Additionally, real-world awards (e.g., rebates, coupons, gift cards to merchants, etc.) may be given for earning gaming achievements. This could be attractive to some parents as the parents could receive real-world awards in response to their children's gaming activities. Any and all such variations are contemplated to be within the scope of embodiments of the present invention.

Some embodiments of the present invention provide users with the ability to transfer achievements to another user or group. For instance, a user may earn an achievement and transfer that achievement to another user or group as a gift, donation, or for a fee. This may include transferring an achievement from the user's achievement profile to another user's or group's achievement profile. In this way, a user could, for instance, provide earned achievements to help a friend or family member in some way.

In other embodiments, a user may earn achievements for another person or group. In particular, when a user participates in an offline activity that earns an achievement, that achievement is awarded to the other person or group. For instance, a user may wish to earn achievements to support a particular cause. When achievements are earned by that user, the achievements are awarded to a designated group that supports the cause. In essence, the user would be donating earned achievements to the group. In some embodiments, merchants may be able to specifically sponsor "donation" achievements that are earned by users but awarded to a particular group supporting a particular cause.

Another embodiment of the present invention is directed to a brokerage service that allows users to trade achievements (gaming achievements and/or offline activity achievements), virtual currency, and/or other forms of awards amongst themselves. For instance, one person may wish to trade achievements for virtual currency while another user may wish to trade virtual currency for achievements. The brokerage service would provide a platform for the two users to find each other and agree on a trade. The brokerage service may include an online site that allows users to post trade offers or otherwise indicate a desire to trade achievements, virtual currency, or another form of award. Other users may view the information, and two users may agree to a trade, which may then be brokered by the brokerage service. In some embodiments, the administrator of the brokerage service may collect a fee or other form of compensation from one or both of the parties for brokering the trade.

Figure 12:
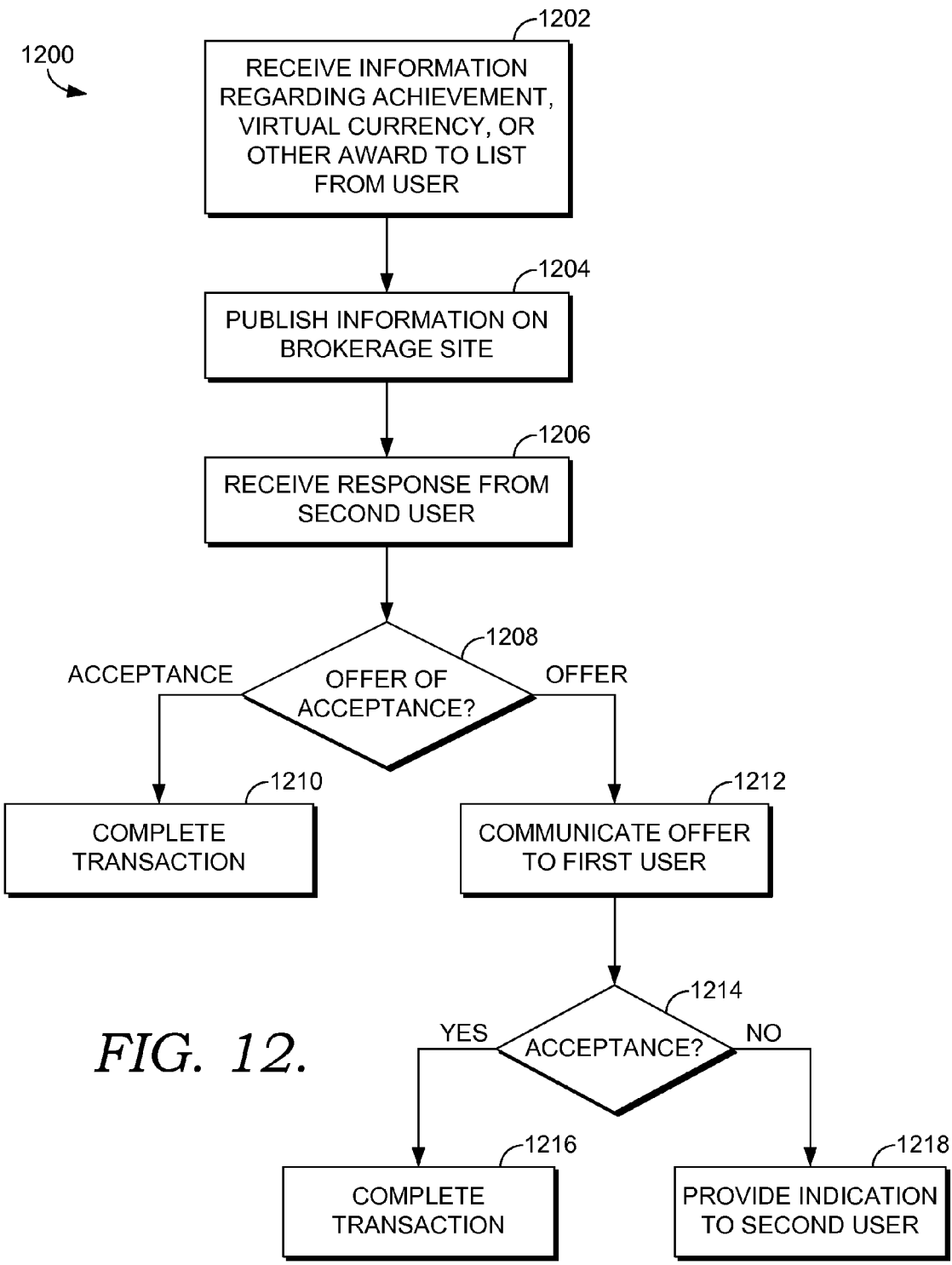
FIG. 12 is a flow diagram showing a method for brokering a trade between users in accordance with an embodiment of the present invention.

A method 1200 for brokering a trade between users in accordance with one embodiment of the present invention is illustrated in FIG. 12. As shown at block 1202, the brokerage service receives information from a user regarding achievements, virtual currency, and/or another form of award that the user would like to list on the brokerage site. This may include information regarding achievements, virtual currency, or other form of award that: (1) the user has and would like to trade, (2) the user is seeking to obtain, or (3) both. In response, the information is published on the online brokerage site, as shown at block 1204. As such, other users may view the information and decide whether to respond to initiate a trade.

As shown at block 1206, a response to the published information is received from a second user. In some cases, the published information may be a specific trade offer that invites an acceptance. As such, the response may simply comprise an acceptance of the offer based on the terms specified by the published information. If the response is determined to be an acceptance at block 1208, the transaction may be completed by transferring the items between the parties' profiles, accounts, or otherwise facilitating the transaction, as shown at block 1210.

In other instances, the published information may invite an offer (or counteroffer) from the second user that may be provided to the first user for acceptance or rejection. Accordingly, if an offer (or counteroffer) is determined at block 1208, the offer is communicated to the first user, as shown at block 1212. If the first user accepts the offer at block 1214, the transaction is completed, as shown at block 1216. As noted above, this may include transferring specified items between the parties' profiles, accounts, or otherwise facilitating the transaction. Alternatively, if the first user decides to reject the offer, an indication is provided to the second user, as shown at block 1218. This may conclude the interaction between the parties, or the two parties may continue to trade counteroffers until an acceptance is reached or the parties decide not to complete a transaction.

In still further embodiments of the present invention, users may earn awards based on their achievements (gaming achievements and/or offline activity achievements) when visiting particular locations if the users are determined to be an achievements "leader" by having more achievements than other users at the location at that time. In some embodiments, a dynamic "leaderboard" may be displayed at a particular location (e.g., store front) that lists a user profile name for those users currently visiting the location. In some instances, this may be limited to users who also belong to the location (e.g., "like" the location in a social networking environment). The leaderboard may rank those users who have the greatest level of achievements. This may be based on, for instance, each user's total number of achievements, achievement points, achievement score, or gamer score. In some instance, the achievements used to rank the users may be limited to certain achievements (e.g., achievements associated with a particular activity or merchant). Offline benefits may be provided to the present leader(s) at the location. For instance, the offline benefits may include discounts, free merchandise, pass to the front of the line, or other benefits.

Figure 13:
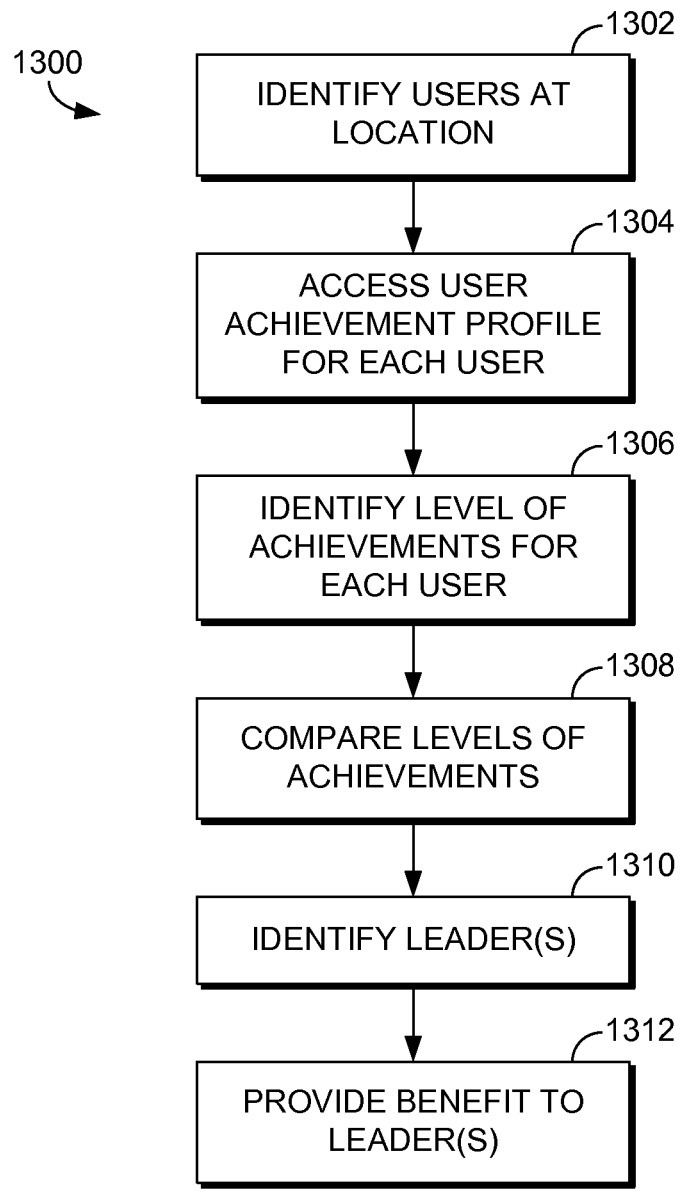
FIG. 13 is a flow diagram showing a method for providing benefits to a leader having the greatest level of achievements at a current location in accordance with an embodiment of the present invention.

FIG. 13 provides a flow diagram that illustrates a method 1300 for providing benefits to a leader having the greatest level of achievements at a current location in accordance with an embodiment of the present invention. As shown at block 1302, users at a particular location are identified. The users may be identified using any number of different approaches for tracking users' offline locations and activities as discussed hereinabove. A user achievement profile for each of the identified users is access, as shown at block 1304. A level of achievements for each of the users is identified from each user's achievement profile at block 1306. As noted above, the level of achievements for each user may be limited to certain achievements. For instance, the achievements considered may be limited to achievements from particular activities or achievements sponsored by a particular merchant. Additionally, the achievements may be any combination of offline activity achievements and/or gaming achievements.

The level of achievements for each of the users is compared, as shown at block 1308. Based on the comparison, one or more of the users are identified as "leaders" at block 1310, and benefits are provided to each of the one or more leaders, as shown at block 1312. In some instances, only a single leader is provided benefits; while in other embodiments, the top N leaders may be given benefits. Because the leaders may dynamically change as users arrive and leave the location, the leaders may be determined on some defined basis. This may be a time basis (e.g., every half hour) or may be based on the comparison of achievement levels (e.g., benefits only provided if a user has a level of achievements that is above a threshold or significantly higher than the level for other users at the location).

As can be understood, embodiments of the present invention provide for a system for awarding achievements for user participation in offline activities and allowing for alternative awards based on earned achievements. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer-storage hardware devices storing computer-useable instructions that, when used by one or more computing devices, cause the one or more computing devices to perform a method, the method comprising:

storing, by an achievement system provided by a gaming system provider providing a gaming system platform, definitions for a plurality of gaming achievements and offline achievements, the definition for each gaming achievement specifying a gaming achievement being achievable via game play of at least one game on the gaming system platform and associated with a corresponding number of achievement points, the definition for each offline achievement specifying a corresponding offline activity for which participation in the corresponding offline activity results in awarding the offline achievement and a corresponding number of achievement points, wherein the achievement points are not a form of virtual currency, have no monetary value, and are not redeemable;

receiving, at the achievement system over one or more communication networks, an indication of a user being located at a particular location based on detection of a mobile device associated with the user at the particular location;

based on the indication of the user being located at the particular location and a first definition for a first offline achievement from the plurality of offline achievements specifying the particular location, identifying, by the achievement system, participation by the user in a first offline activity corresponding with the first offline achievement;

awarding, by the achievement system, the first offline achievement to the user for participation in the first offline activity;

providing, by the achievement system, a certain number of achievement points based on the first offline achievement; and storing, by the achievement system, the first offline achievement and the certain number of achievement points in a gaming achievement profile storing gaming achievements earned by the user, offline achievements earned by the user, and offline achievement points earned by the user for participating in different offline activities, the gaming achievement profile further including a score for the user based at least in part on the offline achievement points earned by the user, the gaming achievement profile providing an online profile accessible, over the one or more communication networks, by the user and one or more other users to view the gaming achievements and offline achievements earned by the user and the score for the user.

2. The one or more computer-storage hardware devices of claim 1, wherein the first definition for the first offline activity is based on an indication from a merchant of the first offline activity having a given time and the particular location.

3. The one or more computer-storage hardware devices of claim 1, wherein a second definition for a second offline activity from the plurality of offline activities is based on an indication from a merchant of a type of offline activity having merchant-defined criteria.

4. The one or more computer-storage hardware devices of claim 1, wherein the method further comprises:
- identifying a plurality of users currently at a particular location;
- accessing an achievement profile for each of the users;
- identifying a level of achievements for each of the users from each user's achievement profile;
- identifying at least one leader based on the level of achievements for each of the users; and
- awarding a benefit to the at least one leader.

5. The one or more computer-storage hardware devices of claim 1, wherein receiving the indication of the user being located at the particular location comprises receiving location information from the mobile device associated with the user.

6. The one or more computer-storage hardware devices of claim 1, wherein receiving the indication of the user being located at the particular location comprises receiving an indication that a user has checked into the particular location by placing the mobile device associated with the user near a near-field communication device used to track participation in the first offline activity.

\* \* \* \* \*